(12) United States Patent
Hung et al.

(10) Patent No.: US 9,235,012 B1
(45) Date of Patent: Jan. 12, 2016

(54) OPTICAL COUPLING LENS AND OPTICAL COMMUNICATION MODULE HAVING SAME

(71) Applicant: HON HAI PRECISION INDUSTRY CO., LTD., New Taipei (TW)

(72) Inventors: Yi Hung, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/475,808

(22) Filed: Sep. 3, 2014

(51) Int. Cl.
G02B 6/32 (2006.01)
G02B 6/42 (2006.01)
G02B 6/34 (2006.01)

(52) U.S. Cl.
CPC ............... G02B 6/4214 (2013.01); G02B 6/34 (2013.01)

(58) Field of Classification Search
CPC .................................. G02B 6/34; G02B 6/4214
USPC ............................................................. 385/33
See application file for complete search history.

(56) References Cited

U.S. PATENT DOCUMENTS 6,947,671 B2 * 9/2005 Sekiya ..................... G02B 6/32
359/489.09

* cited by examiner

Primary Examiner — Jerry Blevins
(74) Attorney, Agent, or Firm — Novak Druce Connolly Bove + Quigg LLP

(57) ABSTRACT

An optical communication module includes an optical transmitter, an optical coupling lens, and an optical fiber. The optical coupling lens includes a first surface, a second surface, a reflection surface, a first lens unit, and a second lens unit. An included angle between the first surface and the second surface is 82 degrees. An included angle between the first surface and the reflection surface is 45 degrees. The first lens unit is positioned on the first surface. The second lens unit is positioned on the second surface. The optical transmitter is positioned towards the first surface and aligned with the first lens unit. An optical fiber is positioned towards the second surface and aligned with the second lens unit.

10 Claims, 3 Drawing Sheets

OPTICAL COUPLING LENS AND OPTICAL COMMUNICATION MODULE HAVING SAME

FIELD

The subject matter herein generally relates to fiber optic communication technologies, and particularly to an optical coupling lens and an optical communication module having the optical coupling lens.

BACKGROUND

In the field of fiber optic communication, optical coupling lenses are common components. A typical optical coupling lens includes a light incident surface, a light emitting surface, a reflection surface, a first lens unit, and a second lens unit. An included angle between the light incident surface and the light emitting surface is 90 degrees. An included angle between the light incident surface and the reflection surface is 45 degrees. An included angle between the light emitting surface and the reflection surface is also 45 degrees. The first lens is positioned on the light incident surface. The second lens is positioned on the light emitting surface. In use, a light transmitter is positioned towards the light incident surface and is aligned with the first lens unit. An optical fiber is aligned with the second lens unit. The light transmitter emits a light beam to the first lens unit. The first lens unit focuses the light beam into parallel light beam. The parallel light beam transmits to the reflection surface and is reflected to the second lens unit by the reflection surface. The reflected light beam is focused into the optical fiber by the second lens unit.

BRIEF DESCRIPTION OF THE DRAWINGS

Implementations of the present technology will now be described, by way of example only, with reference to the attached figures.

DETAILED DESCRIPTION

Figure 1:
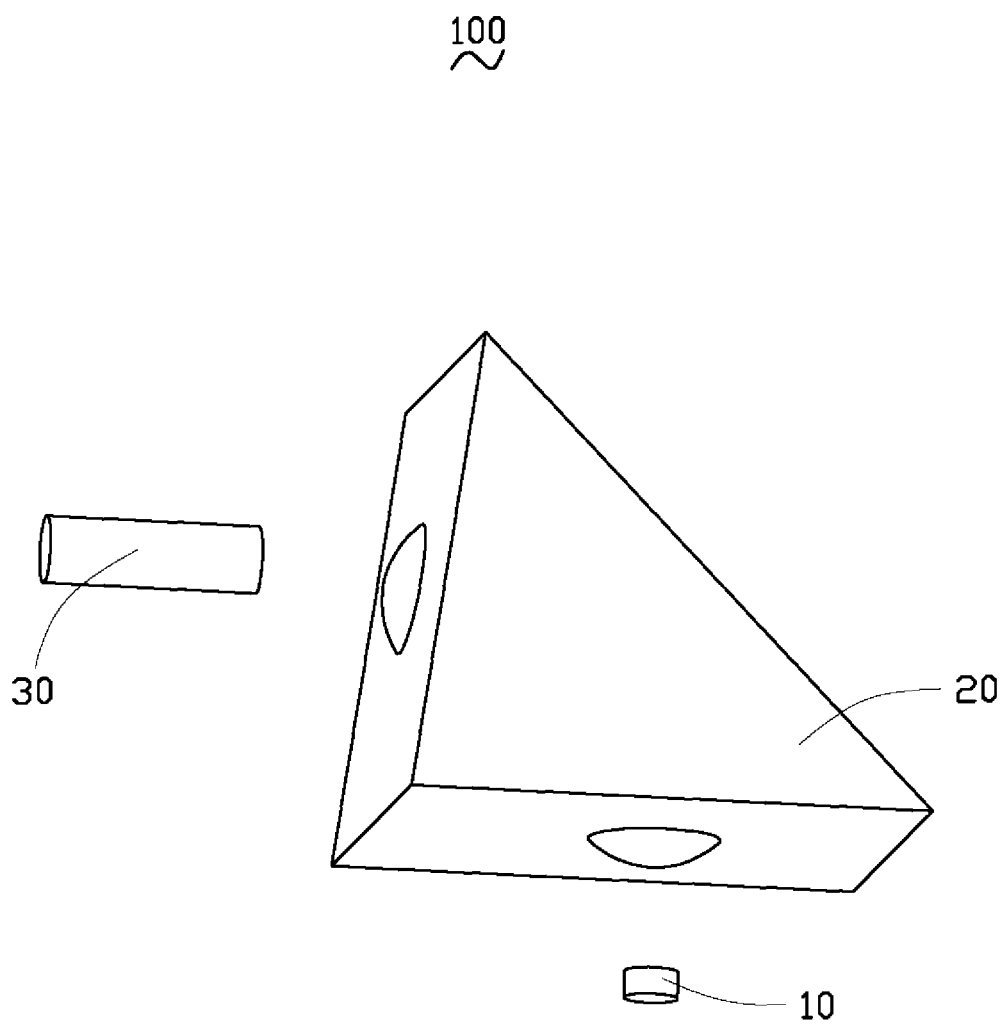
FIG. 1 is an isometric view of an embodiment of an optical communication module with an optical coupling lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, an embodiment of an optical communication module 100 includes an optical transmitter 10, an optical coupling lens 20, and an optical fiber 30. The optical transmitter 10 can be a light emitting diode or a laser diode, for example.

Figure 2:
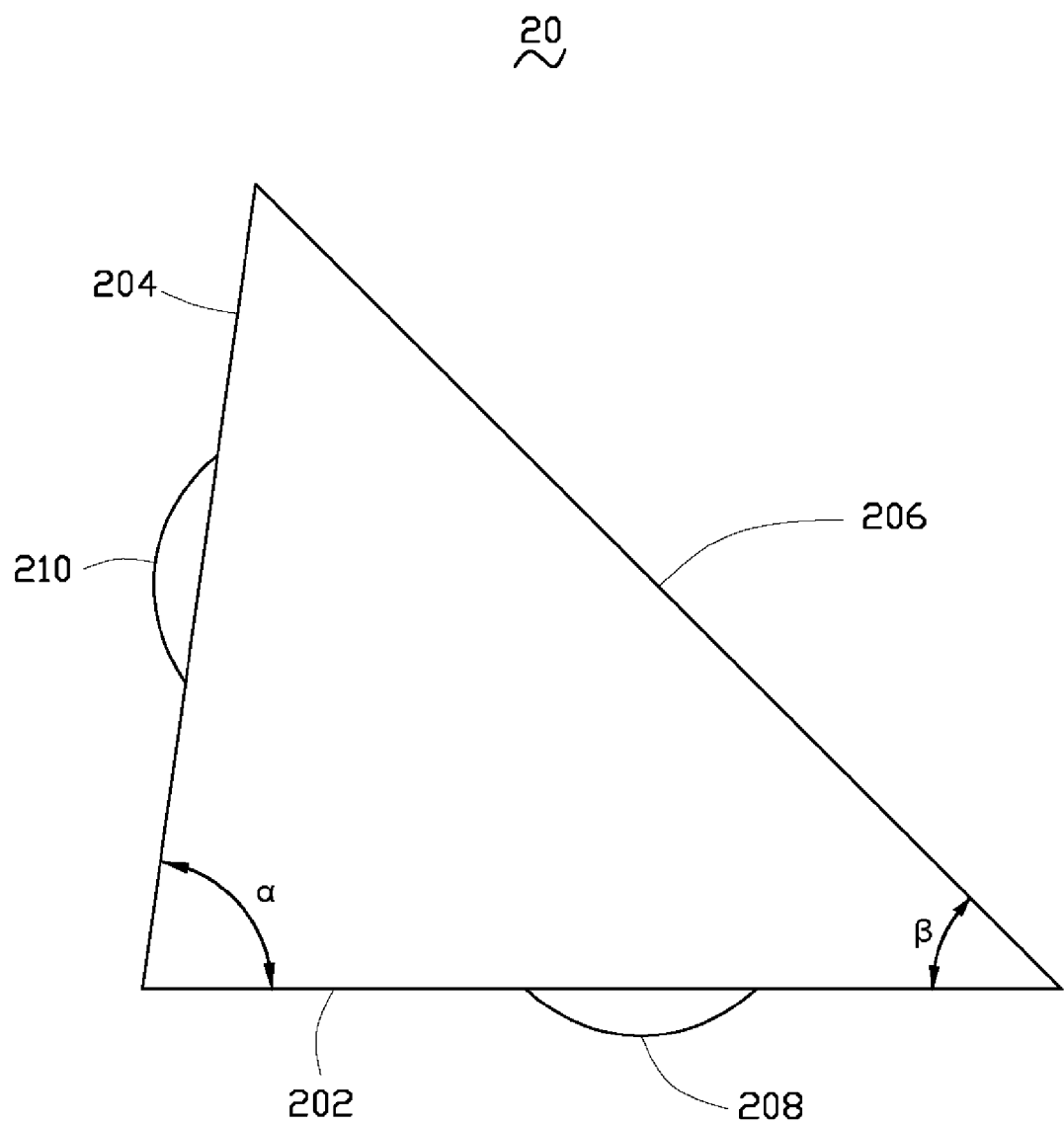
FIG. 2 is an elevational view of the optical coupling lens of FIG. 1.

Referring to FIG. 2, the optical coupling lens 20 includes a first surface 202, a second surface 204, a reflection surface 206, a first lens unit 208, and a second lens unit 210. An included angle $\alpha$ between the first surface 202 and the second surface 204 is 82 degrees. An included angle $\beta$ between the first surface 202 and the reflection surface 206 is 45 degrees. The first lens unit 208 is positioned on the first surface 202. The second lens unit 210 is positioned on the second surface 204. An optical axis of the first lens unit 208 intersects with an optical axis of the second lens unit 210 on the reflection surface 206. In the illustrated embodiment, the optical coupling lens 20 is a prism. The first surface 202 is directly connected to the second surface 204 and the reflection surface 206. The second surface 204 is directly connected to the reflection surface 206. The first lens unit 208 and the second lens unit 210 are both convex lenses.

The optical transmitter 10 is positioned towards the first surface 202 and aligned with the first lens unit 208. The optical fiber 30 includes an end surface 302. The end surface 302 is positioned towards the second surface 204 and aligned with the second lens unit 210. An included angle $\gamma$ between an optical axis of the optical fiber 30 and the optical axis of the second lens unit 210 is 8 degrees (please see FIG. 3).

Figure 3:
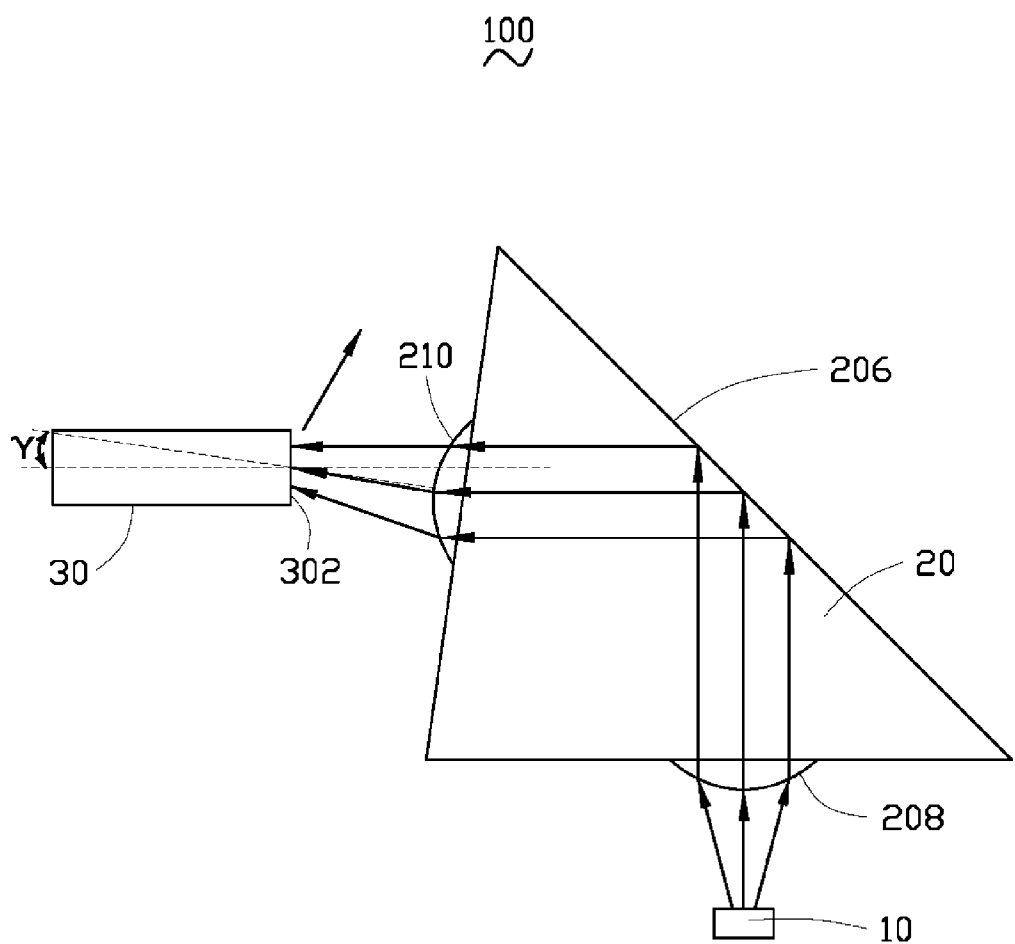
FIG. 3 is a diagrammatic view of the optical communication module of FIG. 1, in use.

Referring to FIG. 3, in use, the optical transmitter 10 emits a light beam to the first lens unit 208. The first lens unit 208 focuses the light beam into a parallel light beam. The parallel light beam transmits to the reflection surface 206 and is reflected to the second lens unit 210. The second lens unit 210 focuses the reflected light beam to the end surface 302. Minor portion of the focused light beam is reflected by the end surface 302, and the remainder of the focused light beam transmits into the optical fiber 30. Because the included angle $\gamma$ is 8 degrees, the minor portion of the focused light beam reflected by the end surface 302 cannot come back the second lens unit 210. Because the included angle $\alpha$ is 82 degrees, the second surface 204 cannot reflect the parallel light beam back to the optical transmitter 10. As a result, the return loss of the optical communication module 100 is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical communication module comprising:
   an optical transmitter;
   an optical coupling lens comprising a first surface, a second surface, a reflection surface, a first lens unit, and a second lens unit, an included angle between the first surface and the second surface being 82 degrees, an included angle between the first surface and the reflection surface being 45 degrees, the first lens unit positioned on the first surface, the second lens unit positioned on the second surface, an optical axis of the first lens unit intersecting with an optical axis of the second lens unit on the reflection surface, the optical transmitter positioned towards the first surface and aligned with the first lens unit; and
   an optical fiber positioned towards the second surface and aligned with the second lens unit.

2. The optical communication module of claim 1, wherein the optical fiber comprises an end surface, and the end surface is positioned towards the second surface and aligned with the second lens unit.

3. The optical communication module of claim 1, wherein an included angle between an optical axis of the optical fiber and the optical axis of the second lens unit is 8 degrees.

4. The optical communication module of claim 1, wherein the optical coupling lens is a prism, the first surface is directly connected to the second surface and the reflection surface, and the second surface is directly connected to the reflection surface.

5. The optical communication module of claim 1, wherein the first lens unit and the second lens unit are convex lenses.

6. The optical communication module of claim 1, wherein the optical transmitter is a light emitting diode or a laser diode.

7. An optical coupling lens comprising:
   a first surface;
   a second surface;
   a reflection surface, an included angle between the first surface and the second surface being 82 degrees, an included angle between the first surface and the reflection surface being 45 degrees;
   a first lens unit positioned on the first surface; and
   a second lens unit positioned on the second surface, an optical axis of the first lens unit intersecting with an optical axis of the second lens unit on the reflection surface.

8. The optical coupling lens of claim 7, wherein the optical coupling lens is a prism, the first surface is directly connected to the second surface and the reflection surface, and the second surface is directly connected to the reflection surface.

9. The optical coupling lens of claim 7, wherein the first lens unit and the second lens unit are convex lenses.

10. An optical coupling device comprising:
    a reflective surface;
    a first lens unit having a first lens unit axis; and
    a second lens unit having a second lens unit axis;
    wherein, a plane formed perpendicular to the first lens axis is at an 82 degree angle to a plane formed perpendicular to the second lens axis and the first lens plane is at a 45 degree angle to the reflective surface; and
    wherein, the first lens unit axis intersects the second lens unit axis at the reflective surface.

* * * * *